(12) United States Patent
Takeuchi

(10) Patent No.: US 10,125,746 B2
(45) Date of Patent: Nov. 13, 2018

(54) MOTION CONVERSION DEVICE

(75) Inventor: Akio Takeuchi, Nagano (JP)

(73) Assignee: KABUSHIKIKAISHA CHIKUHOU, Nagano (JP)

( * ) Notice: Subject to any disclaimer, the term of this patent is extended or adjusted under 35 U.S.C. 154(b) by 139 days.

(21) Appl. No.: 13/703,872

(22) PCT Filed: Jun. 9, 2011

(86) PCT No.: PCT/JP2011/003269
§ 371 (c)(1),
(2), (4) Date: Dec. 17, 2012

(87) PCT Pub. No.: WO2011/158472
PCT Pub. Date: Dec. 22, 2011

(65) Prior Publication Data
US 2013/0087414 A1  Apr. 11, 2013

(30) Foreign Application Priority Data

Jun. 14, 2010 (JP) ................................. 2010-135214

(51) Int. Cl.
| G07F 11/26 | (2006.01) |
| F03G 3/02 | (2006.01) |
| F03G 7/10 | (2006.01) |

(52) U.S. Cl.
CPC ........ *F03G 3/02* (2013.01); *F03G 7/10* (2013.01)

(58) Field of Classification Search
CPC .................................... F03G 3/02; F03G 7/10
(Continued)

(56) References Cited

U.S. PATENT DOCUMENTS 3,384,906 A * 5/1968 Hamilton .................. E03D 1/34
4/397
3,513,707 A * 5/1970 Russell .............. A63B 24/0021
473/152
(Continued)

FOREIGN PATENT DOCUMENTS

| JP | 30-008320 Y1 | 6/1955 |
| JP | 04-058285 U | 5/1992 |

(Continued)

OTHER PUBLICATIONS

An Office Action; "Notice of Reason for Rejection," issued by the Japanese Patent Office dated Jan. 10, 2014, which corresponds to Japanese Patent Application No. 2012-520280 and is related to U.S. Appl. No. 13/703,872.

(Continued)

*Primary Examiner* — Rakesh Kumar
(74) *Attorney, Agent, or Firm* — Studebaker & Brackett PC

(57) ABSTRACT

A motion conversion device is provided with a chain mechanism (10), a steel ball holding tube (5) having a holding space (5a) capable of holding a plurality of steel balls (1) in a vertical row, a steel ball insertion and holding mechanism (6) provided on a lower end of the steel ball holding tube (5), a balancer mechanism (30) capable of raising the steel ball holding tube (5) using air pressure, and a device for controlling the supply of air pressure to the balancer mechanism (30) according to the movement of the chain mechanism (10). A plurality of baskets (15) is attached to the chain (13) of the chain mechanism (10) at fixed intervals, the baskets (15) being capable of receiving and holding steel balls (1) spilling out of the upper end of the steel ball holding tube (5). The baskets (15) containing steel balls (1) move downward in response to the movement of the chain mechanism (Continued)

(10), and the steel balls (1) spill out at the lower end and roll to a position directly beneath the steel ball holding tube (5).

2 Claims, 7 Drawing Sheets

(58) Field of Classification Search
USPC .............. 221/48, 1, 253; 206/531, 538, 534; 185/32; 60/639, 398
See application file for complete search history.

(56) References Cited

U.S. PATENT DOCUMENTS

| | | | | |
|---|---|---|---|---|
| 3,513,848 A * | 5/1970 | Garvey | ................ | A61B 17/04 156/73.1 |
| 3,674,602 A * | 7/1972 | Keogh | ................ | H05K 7/06 156/433 |
| 3,690,511 A * | 9/1972 | Wigham | ................ | A01C 9/02 221/174 |
| 3,725,026 A * | 4/1973 | Hamilton | ................ | B32B 17/10807 65/152 |
| 3,857,242 A * | 12/1974 | Gilmore | ................ | F03B 17/04 60/495 |
| 4,074,526 A * | 2/1978 | West | ................ | F03B 17/00 417/328 |
| 4,100,743 A * | 7/1978 | Trumbull | ................ | F03G 3/02 60/639 |
| 4,201,059 A * | 5/1980 | Feder | ................ | F03G 3/04 185/33 |
| 4,492,287 A * | 1/1985 | Umehara | ................ | F03G 3/00 185/33 |
| 4,538,415 A * | 9/1985 | Lebecque | ................ | F03G 3/00 285/33 |
| 4,718,232 A * | 1/1988 | Willmouth | ................ | F03B 17/04 290/1 R |
| 4,817,818 A * | 4/1989 | Lockhart | ................ | A47F 1/08 221/1 |
| 4,848,134 A * | 7/1989 | Elkins | ................ | G01M 17/0078 73/12.04 |
| 4,848,135 A * | 7/1989 | Kuno | ................ | 72/371 |
| 5,142,134 A * | 8/1992 | Kunkel | ................ | 250/205 |
| 5,325,993 A * | 7/1994 | Cooper, III | ................ | A21C 9/083 221/211 |
| 5,905,312 A * | 5/1999 | Liou | ................ | F03G 7/10 290/54 |
| 6,249,057 B1 * | 6/2001 | Lehet | ................ | F03B 17/02 290/1 R |
| 6,371,330 B1 * | 4/2002 | Knez | ................ | A63B 47/002 221/200 |
| 6,638,003 B2 * | 10/2003 | Yuyama | ................ | B65G 59/106 221/251 |
| 7,083,066 B2 * | 8/2006 | Neveu | ................ | A47K 10/424 221/45 |
| 7,434,396 B2 * | 10/2008 | McGahee | ................ | F03B 17/04 60/495 |
| 7,918,087 B1 * | 4/2011 | Brown | ................ | F03B 7/006 60/398 |
| 8,003,143 B2 * | 8/2011 | Taylor | ................ | B65B 5/101 222/146.6 |
| 8,061,556 B2 * | 11/2011 | Sands | ................ | F25D 25/005 206/499 |
| 8,112,992 B2 * | 2/2012 | Pirincci | ................ | H02K 53/00 60/495 |
| 8,171,729 B2 * | 5/2012 | O'Briant | ................ | F03B 17/04 290/1 R |
| 8,516,812 B2 * | 8/2013 | Manakkattupadeettathil ................ 60/495 |
| 2004/0212194 A1 | 10/2004 | Okusawa et al. | | |
| 2010/0126804 A1 * | 5/2010 | Sabapathy | ................ | F03B 17/04 185/32 |
| 2011/0298412 A1 * | 12/2011 | Bilat | ................ | H02P 8/32 318/696 |
| 2013/0270836 A1 * | 10/2013 | Quraishy | ................ | F03G 3/00 290/1 A |

FOREIGN PATENT DOCUMENTS

| | | | |
|---|---|---|---|
| JP | 05270661 A | * | 10/1993 |
| JP | H05-270661 A | | 10/1993 |
| JP | 07-176311 A | | 7/1995 |
| JP | 3053124 U | | 7/1998 |
| JP | 2002-138944 A | | 5/2002 |
| JP | 2002138944 A | * | 5/2002 |
| WO | 2003/034523 A1 | | 4/2003 |

OTHER PUBLICATIONS

International Search Report; PCT/JP2011/003269; dated Aug. 23, 2011.

* cited by examiner

MOTION CONVERSION DEVICE

TECHNICAL FIELD

The present invention relates to a device for converting potential energy generated by spherical objects being vertically conveyed into rotational movement.

TECHNICAL BACKGROUND

In the light of the recent drive towards reduced $CO_2$ emissions, there has been an increasing demand for systems for generating power using forms of natural energy such as wind power and water power. Apart from such large-scale, natural energy-utilizing systems, there has also been a demand for power generation systems allowing the comparatively small amounts of electrical power needed in the home to be generated within the household. One example thereof is the home fuel cell, for which a variety of proposals have been made, some of which have already been put to practical use (see, for example, patent documents 1 and 2).

PRIOR ARTS LIST

Patent Document

Patent Document 1: International Patent Publication No. WO 2003/034523A1

Patent Document 2: Japanese Laid-Open Patent Publication No. H7-176311(A)

SUMMARY OF THE INVENTION

Problems to be Solved by the Invention

The home fuel device used in the power generation system described above has the problems of a complicated configuration and high cost. Thus, a mechanism capable of rotating a power generator using as simple a configuration as possible is desired.

The present invention was contrived in the light of the above problems, and has as an object thereof the provision of a device capable of using potential energy generated from spherical objects being vertically conveyed to obtain rotational movement for rotatably driving a power generator or the like using a simple configuration.

Means to Solve the Problems

In order to resolve the problems described above, the motion conversion device according to the present invention is provided with a wrapped member transmission mechanism comprising a pair of rotating members, separated vertically and disposed so as to be freely rotatable, and a wrapped member wrapped around the pair of rotating members; a sphere holding member capable of holding a plurality of spheres in a vertical row, the sphere holding member having a cylindrical holding space extending vertically; a sphere insertion and holding mechanism for holding the spheres so that the spheres can be inserted into the holding space from the lower surface of the sphere holding member but the spheres do not fall downward out of the holding space, the sphere insertion and holding mechanism being provided at the lower end of the sphere holding member; a vertical operating mechanism that, upon being operated after receiving external drive force, is capable of performing a raising operation of raising the sphere holding member in which the plurality of spheres are held in a vertical row within the holding space and a lowering operation for lowering only the sphere holding member in which the plurality of spheres are held in a vertical row within the holding space, the vertical operating mechanism being provided with a balancer mechanism capable of raising the sphere holding member in which the plurality of spheres are held in a vertical row within the holding space; and switching means for controlling the supply of external drive force to the vertical operating mechanism according to the rotation of the pair of rotating members and switching between the raising operation and the lowering operation. A plurality of sphere receptacle members is attached to the wrapped member at constant intervals, the sphere receptacle members being capable of receiving and holding, at the upper part of the wrapped member transmission mechanism, spheres spilling from the upper end of the holding space of the sphere holding member, and the sphere receptacle members containing spheres move downward with the movement of the wrapped member as the rotating members of the wrapped member transmission mechanism rotate. When the wrapped member wraps around the lower rotating member at the bottom part of the wrapped member transmission mechanism, the spheres spill out of the sphere receptacle members and roll to a position opposing the lower end of the sphere holding member. The switching means switches in order between the raising operation and the lowering operation of the vertical operating mechanism according to the rotation of the pair of rotating members. The sphere holding member having the plurality of spheres held in a vertical row within the holding space is raised as a consequence of the raising operation, and there is formed a space into which the spheres having spilled out of the sphere receptacle members at the bottom of the wrapped member transmission mechanism can roll to a position opposing the lower end of the sphere holding member. When the lowering operation is performed with a sphere having rolled into the position opposing the lower end of the sphere holding member, only the sphere holding member is lowered, thereby forcing the sphere into the holding space through the operation of the sphere insertion and holding mechanism.

The balancer mechanism may be configured so as to be operated by supplied air pressure. The balancer mechanism may also be configured so as to be operated by motive force from an electric motor.

Advantageous Effects of the Invention

In accordance with the motion conversion device having the configuration described above, the wrapped member transmission mechanism can be operated and the rotating member thereof rotated by spheres being ejected in order from the upper end of the sphere holding member by the upward and downward motion of the sphere insertion and holding mechanism caused by the vertical operating mechanism, and the ejected spheres being received by the sphere receptacle members at the top of the wrapped member transmission mechanism. Thus, the rotating member can be coupled to a power generator to rotatably drive the power generator in an efficient manner using a simple configuration, thereby generating electrical power.

DESCRIPTION OF THE EMBODIMENTS

First Embodiment

Figure 1:
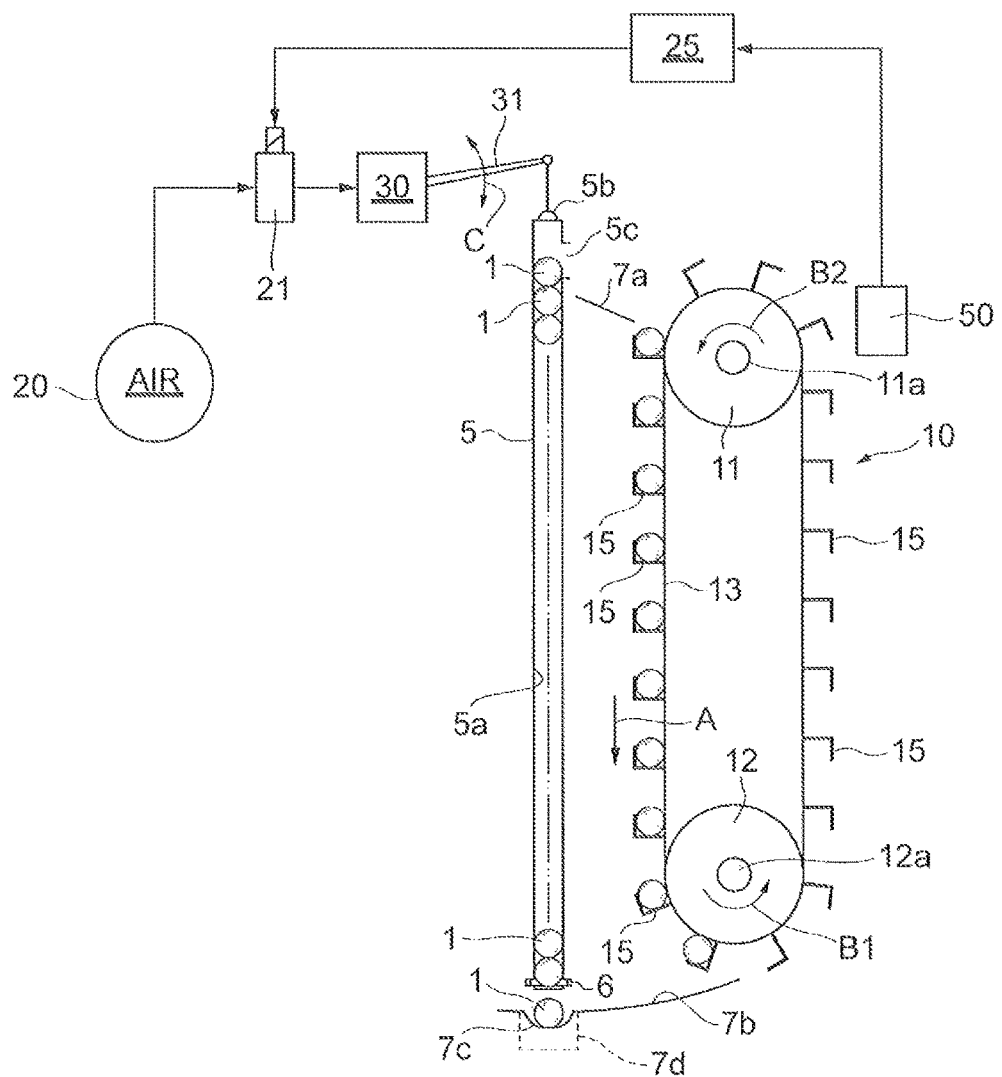
FIG. 1 is an illustration outlining the overall configuration of a motion conversion device according to a first embodiment.
Figures 3A, 3B:
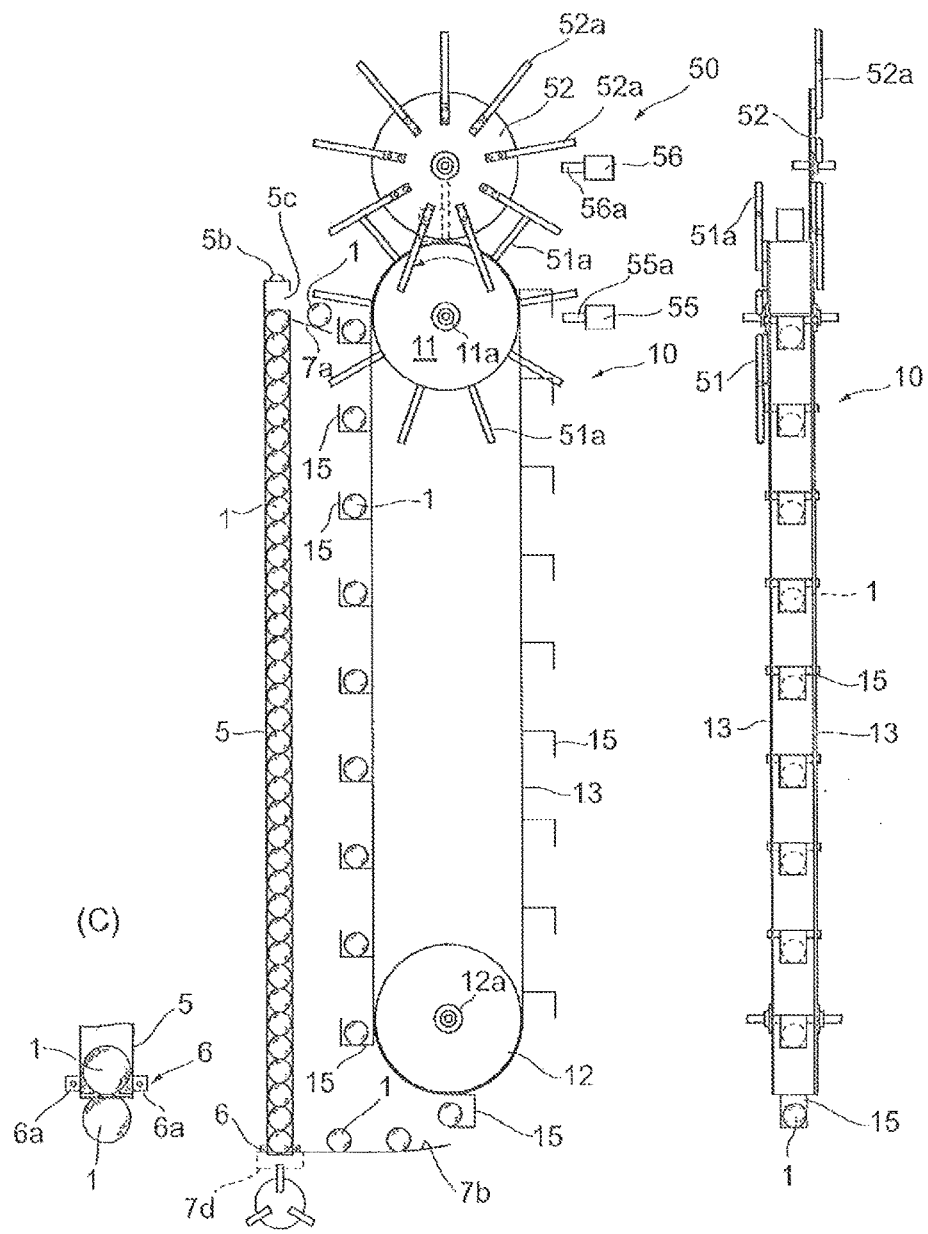
FIG. 3A-3B are a front view, side view, and a partial magnified view of the main elements of the motion conversion device according to the first embodiment.
Figure 4:
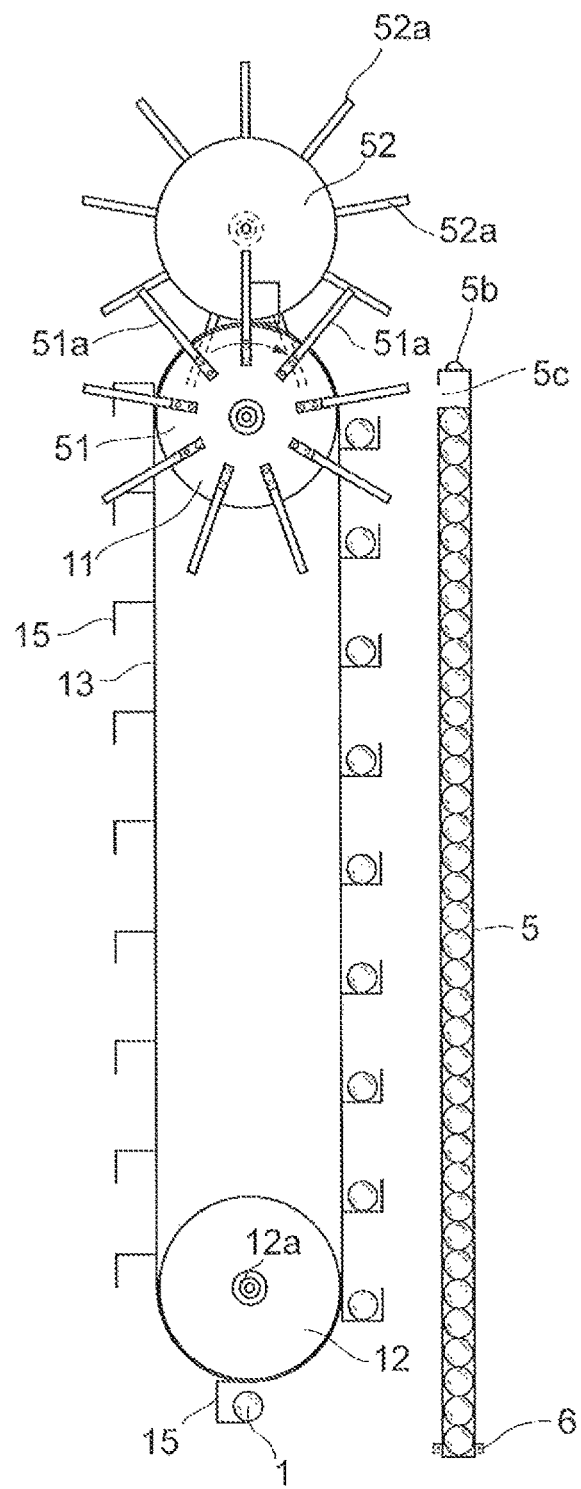
FIG. 4 is a rear view of the main elements of the motion conversion device according to the first embodiment.

A motion conversion device according to a first embodiment of the present invention will be described hereafter with reference to the drawings. FIG. 1 shows an outline of the overall configuration of a motion conversion device according to the present invention, and FIGS. 3 and 4 shows the main elements of the motion conversion device. The motion conversion device is provided with a chain mechanism 10 (wrapped member transmission mechanism). The chain mechanism 10 comprises a pair of sprockets 11, 12, separated vertically and disposed so as to be freely rotatable; and a chain 13 wrapped around the sprockets 11, 12. A plurality of baskets 15, 15 . . . 15 is attached to the outer side of the chain 13 at equal intervals. Each of the baskets 15 is attached so that a receptacle opening thereof faces upward on one side when wrapped around the sprockets 11, 12, and, as described hereafter, and is capable of receiving and holding one steel ball 1 rolling down an upper roll guide 7a.

When a steel ball 1 is received in a basket 15, the weight of the steel ball 1 acts upon one side of the chain 13, the left side of the chain 13 moves downward as shown by arrow A in FIG. 1, and force works upon the sprockets 11, 12 so that they rotate in the counterclockwise direction, as shown by arrows B1, B2. As the chain 13 moves in this way, steel balls 1 are continuously supplied one after another to the baskets 15, and a force corresponding to the total weight of the steel balls 1 in the baskets 15 on the left side of the chain 13 causes the left side of the chain 13 to move downward (in the direction of arrow A), as shown in FIG. 1. In FIG. 1, the baskets 15 open upward, holding the steel balls 1 within, on the left side of the chain 13; but when the baskets 15 rotate around the lower sprocket 12 and are inverted, the openings thereof face first leftward, then downward, ejecting the steel balls 1. Therefore, while the baskets 15 on the left side of the chain 13 receive and hold steel balls 1 that are supplied to them in order, the baskets 15 on the right side are empty.

As a result, the weight of the plurality of steel balls 1 contained in the baskets 15 on the left side causes the left side of the chain 13 to move downward, as shown by arrow A in the drawing, and the sprockets 11, 12 to rotate in the counterclockwise direction, as shown by arrows B1, B2. A rotational shaft 12a of the lower sprocket 12 is coupled to a power generator (not shown), and the rotational force of the sprocket 12 is conveyed to the power generator, driving the power generator to rotate and generate electricity. The power generator may also be coupled to a rotational shaft 11a of the upper sprocket 11. In this example, a wrapped member transmission mechanism comprising a chain and sprockets is used, but a wrapped member transmission mechanism comprising a belt and pulleys (preferably a toothed belt and pulley meshing therewith) may also be used.

As can be seen from the above description, it is possible to rotate the sprockets 11, 12, rotatably driving the power generator to generate electricity, by continuously supplying steel balls 1 one after another to the baskets 15 in time with the movement of the chain 13 along with the rotation of the sprockets 11, 12. The motion conversion device according to the present embodiment is provided with a steel ball supply device for supplying steel balls 1 one after another, which will be described hereafter.

The steel ball supply device is provided with a steel ball holding tube 5 having a cylindrical holding space 5a extending in the perpendicular direction and capable of holding the plurality of steel balls 1 in a vertical row, and an air-operated balancer mechanism 30 capable of raising the steel ball holding tube 5 in which the plurality of steel balls 1 are contained and held in a vertical row within the holding space 5a. An upper end 5b of the steel ball holding tube 5 is suspended from a holding arm 31 of the balancer mechanism 30, allowing the steel ball holding tube 5 to be moved up and down with the plurality of steel balls 1 contained within the holding space 5a through the upward and downward rocking of the holding arm 31 arising from the motion of the balancer mechanism 30 after being supplied with air pressure, as shown by arrow C.

Thus, the balancer mechanism 30 is configured so that air pressure is supplied from an air supply source 20 via an air supply control valve 21, the operation of the air supply control valve 21 being controlled by a controller 25. Further provided is a position detecting switch 50 for detecting the rotational position of the upper sprocket 11 (or the position of travel of the chain 13). A signal for the position detected by the position detecting switch 50 is sent to the controller 25, on the basis of which position detection signal the controller 25 controls the operation of the air supply control valve 21. The upward and downward rocking of the balancer mechanism 30 is thus controlled according to the movement of the chain 13 and the rotation of the upper and lower sprockets 11, 12 in the chain mechanism 10 so that the steel balls 1 are supplied one after the other in time with the movement of the baskets 15, as shown below.

Specifically, as shown in FIGS. 3 and 4, the position detecting switch 50 comprises a first switch plate 51 constituted by a disc rotating integrally with the upper sprocket 11 on which is provided a plurality of first levers 51a in the circumferential direction at equal intervals; a second switch plate 52 constituted by a disc, gear-coupled to the first switch plate 51 and rotating in the opposite direction as the first switch plate 51 at the same speed, on which is provided a plurality of second levers 52a; a first switch 55 operated by the first levers 51a of the first switch plate 51; and a second switch 56 operated by the second levers 52a of the second switch plate 52. When the upper sprocket is rotated, as described above, the first and second switch plates 51, 52 are rotated in synchrony therewith, so that the first levers 51a come into contact with a switch arm 55a of the first switch 55, operating the first switch 55, and the second levers 52a come into contact with a switch arm 56a of the second switch 56, operating the second switch 56.

As a result, the first and second switches 55, 56 are operated in response to the rotation of the upper and lower sprockets 11, 12 and the movement of the chain 13 of the chain mechanism 10, by which operation the rotational position of the upper sprocket 11 is detected. The position detection signal is sent to the controller 25, which controls the operation of the air supply control valve 21 on the basis of the position detection signal, causing the balancer mechanism 30 to rock up and down in response to the rotation of the upper and lower sprockets 11, 12 and the movement of the chain 13 of the chain mechanism 10, supplying steel balls 1 one after another in time with the movement of the baskets 15.

Next, the configuration and operation by which the steel balls 1 are supplied one after another to the baskets 15 in time with the upward and downward rocking of the balancer mechanism 30 will be described below. The steel balls 1 can be inserted into the holding space 5a through the lower surface of the steel ball holding tube 5 at the lower end of the steel ball holding tube 5, where a steel ball insertion and holding mechanism 6 for holding the steel balls 1 so that they do not fall down out of the holding space 5a is provided (see FIG. 3C). The lower end of the holding space 5a of the steel ball holding tube 5 has an opening facing downward, and the steel ball insertion and holding mechanism 6 is provided with three holding claws 6a around the opening in the circumferential direction. The three holding claws 6a are hingeably attached to the steel ball holding tube 5 so as to be capable of rocking upward from a position projecting horizontally into the holding space 5a, with rocking downward from the horizontally projecting position being restricted. The relation of the centers of gravity of the holding claws 6a is such that they project horizontally when not subjected to an external force. A twisting spring urging the holding claws 6a into the horizontally projecting position may also be provided.

Figure 2:
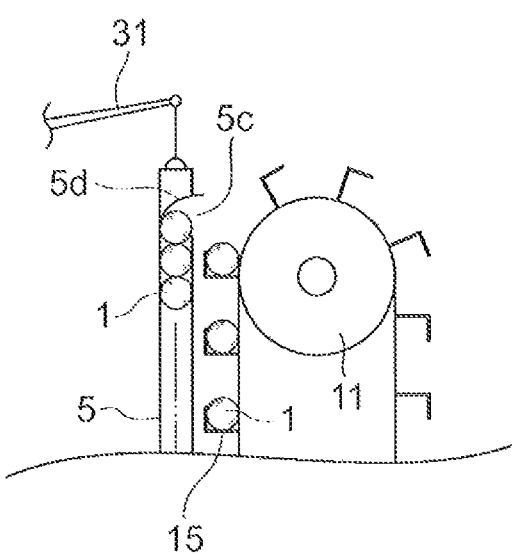
FIG. 2 is an illustration outlining a modified example of a motion conversion device according to the first embodiment.

Thus, when the steel ball holding tube 5 is lowered with a steel ball 1 positioned directly therebeneath, forcing the steel ball 1 into the holding space 5a, the holding claws 6a rock upward to allow the steel ball 1 to enter the holding space 5a. When the steel ball 1 moves upward past the tips of the upward rocking holding claws 6a, the holding claws 6a are returned to the horizontally projecting position by the positional relationship of the centers of gravity thereof, thus being positioned underneath the steel ball 1 that has entered the holding space 5a. Thus, the steel ball 1 is held within the holding space 5a after entering the space by the holding claws 6a. Meanwhile, an outlet 5c facing toward the chain mechanism 10 is formed on the upper part of the steel ball holding tube 5; and, when a new steel ball 1 is forced into the lower end of the holding space 5a as described above, the steel balls 1 within the holding space 5a are pushed relatively upward, with the uppermost steel ball 1 being pushed upward within the holding space 5a and out the outlet 5c, from which it rolls over the upper roll guide 7a into the basket 15, where it is caught and held. It is also acceptable, as shown in FIG. 2, to dispose the steel ball holding tube 5 and the chain mechanism 10 in proximity to each other, provide a guide plate 5d at the upper part of the outlet 5c of the steel ball holding tube 5, and do away with the upper roll guide 7a.

A lower roll guide 7b is provided for guiding the steel ball 1 having been ejected from the basket 15 at the lower part of the chain mechanism 10 by the rotation of the upper and lower sprockets 11, 12 and the movement of the chain 13 of the chain mechanism 10, as described above, to a position directly beneath the steel ball holding tube 5. A shallow holding groove 7c is formed for holding the steel ball 1 in place after having rolled along the lower roll guide 7b to the position directly beneath the steel ball holding tube 5. Underneath the holding groove 7c are formed a steel ball holding mechanism 6 and an insertion groove 7d formed so that the lower end of the steel ball holding tube 5 can be inserted therein.

The movement of the steel balls 1 within the holding space 5a when the steel ball holding tube 5 is rocked up and down by the balancer mechanism 30 in the configuration described above will be described with reference to FIG. 5. (1) shows the plurality of steel balls 1 being held in a vertical row within the holding space 5a. In this state, the steel balls 1 are prevented from falling downward by the steel ball insertion and holding mechanism 6 provided at the lower end of the steel ball holding tube 5. When the steel ball holding tube 5 is raised from this state by the balancer mechanism 30, moving upward from the position shown in (2) to that shown in (3), the lower end of the steel ball holding tube 5 moves away from the holding groove 7c in the lower roll guide 7b, allowing a steel ball 1 that has come rolling down the lower roll guide 7b in the interim to be received by the holding groove 7c. (4) shows the steel ball 1 held in the holding groove 7c in this state. When, in this state, the steel ball holding tube 5 is lowered by the balancer mechanism 30, the lowest steel ball 1 within the holding space 5a comes into contact with the steel ball 1 in the holding groove 7c, so that only the steel ball holding tube 5 moves downward, as shown in (5) through (7).

At this time, the steel ball 1 in the holding groove 7c pushes upon the holding claws 6a so that they rock upward, allowing the steel ball 1 into the holding space 5a, as illustrated. At this point, the steel ball holding tube 5 is capable of being moved further downward, as shown in (8), so as to be inserted into the insertion groove 7d, which is formed, as described above, underneath the holding groove 7c so that the lower part of the steel ball holding tube 5 can be inserted thereinto along with the steel ball insertion and holding mechanism 6 (with the steel ball 1 continuing to be held in the holding groove 7c). This forces the steel ball 1 in the holding groove 7c further into the holding space 5a. When the steel ball holding tube 5 is lowered enough that the steel ball 1 passes the tips of the holding claws 6a, the positions of the centers of gravity of the holding claws 6a causes them to rock back to the horizontal position, as shown in (8) and (9). As a result, the steel ball 1 in the holding groove 7c is forced into the holding space 5a and held by the steel ball insertion and holding mechanism 6 so that it cannot fall downward.

When a new steel ball 1 is inserted into the holding space 5a in this manner, all of the plurality of steel balls 1 in a vertical row within the holding space 5a is moved relatively upward. As a result, the uppermost steel ball 1 within the steel ball 1 is pushed up upward with the holding space 5a and out the outlet 5c, from which it rolls over the upper roll guide 7a into the basket 15, where it is caught and held.

As can be seen from the foregoing, it is possible, through the raising and lowering of the steel ball holding tube 5 by the balancer mechanism 30, to force the steel ball 1 having rolled down the lower roll guide 7b onto the holding groove 7c into the holding space 5a, and to eject the uppermost steel ball 1 within the holding space 5a from the outlet 5c, causing the ball to roll over the upper roll guide 7a into the basket 15. Guiding steel balls 1 into the baskets 15 in this way causes the chain mechanism 10 to operate and the lower sprocket 12 to rotate, rotatably driving the power generator to generate electricity. At this time, the operating position of the chain mechanism 10 (i.e., the rotational positions of the upper and lower sprockets 11, 12 and the travel position of the chain 13) is detected by the position detecting switch 50, and the supply of air pressure to the balancer mechanism 30 is adjusted according to the detected position, thereby adjusting the timing of the upward and downward motion of the balancer mechanism 30. As a result, the balancer mechanism 30 is continuously moved upward and downward, steel balls 1 are continuously supplied one after another to the baskets 15, and the chain mechanism 10 is continuously operated, thereby allowing for the efficient generation of power by the power generator.

In the embodiment described above, the balancer mechanism 30 is operated by supplied air pressure, but the motive source is not limited thereto. For example, a configuration utilizing hydraulic pressure or another type of fluid pressure is acceptable, as is an electrically driven configuration.

Second Embodiment

Thus, a motion conversion device according to a second embodiment, configured so that the balancer mechanism is operated by an electrical motor as a motive source, will be described hereafter with reference to FIGS. 6 and 7. FIG. 7 shows the upper part of the mechanism shown in FIG. 6 in magnified view.

This motion conversion device is also provided with a chain mechanism 110 (wrapped member transmission mechanism). The chain mechanism 110 is provided over a first support device 101 extending in the perpendicular direction upon a base platform 100. The chain mechanism 110 has a configuration similar to that of the chain mechanism 10 of the first embodiment, and comprises a pair of sprockets 111, 112, separated vertically and disposed so as to be freely rotatable; and a chain 113 wrapped around the sprockets 111, 112. A plurality of baskets 115, 115 . . . 115 is attached to the outer side of the chain 113 at equal intervals. The first support device 101 has a support member 101a extending perpendicularly from the base platform 100, and the sprockets 111, 112 are rotatably attached to the upper and lower ends, respectively, of the support member 101a by rotational shafts 111a and 112a. The baskets 115 are attached so that receptacle openings thereof are positioned facing upward on one side of the mechanism (the left side in the drawings) when wrapped around the sprockets 111, 112, and, as will be described hereafter, and are capable of retaining one steel ball 1 ejected from a steel ball holding tube 120 apiece.

Figure 6:
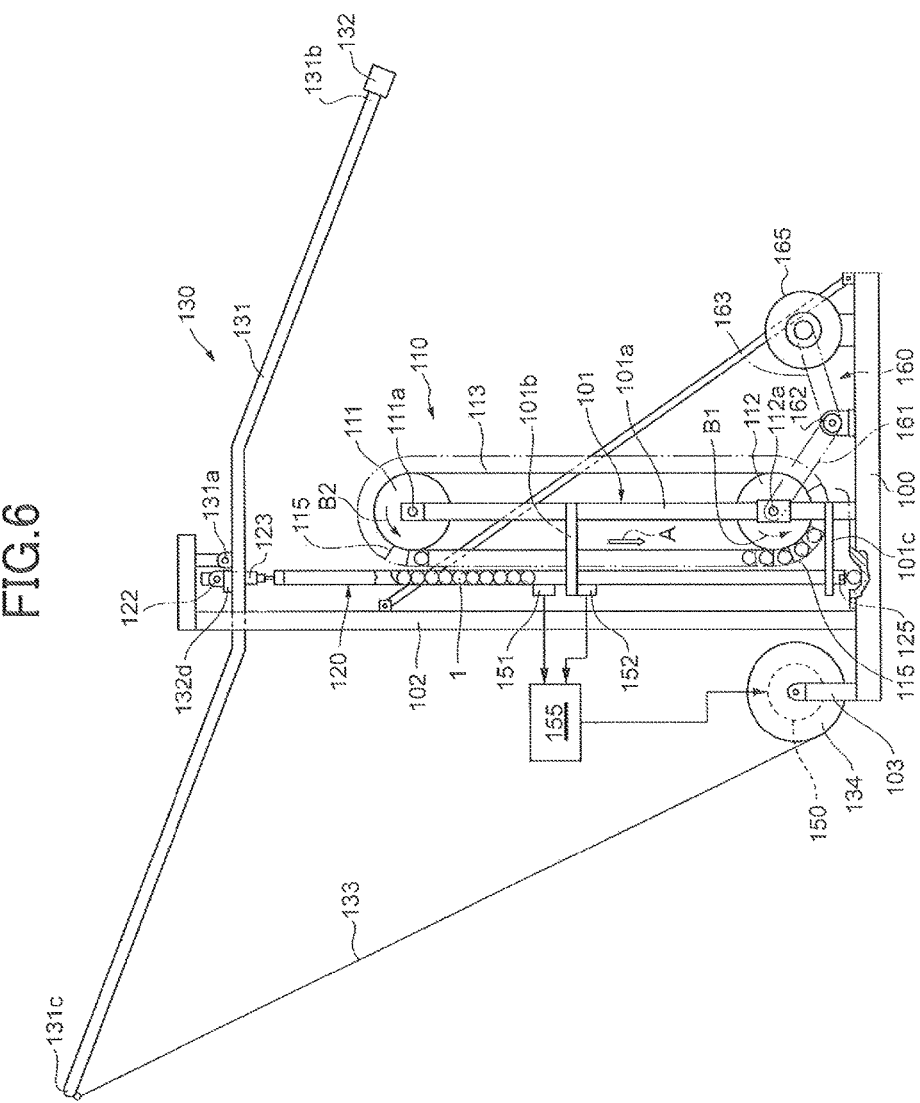
FIG. 6 is an illustration outlining the overall configuration of a motion conversion device according to a second embodiment.
Figure 7:
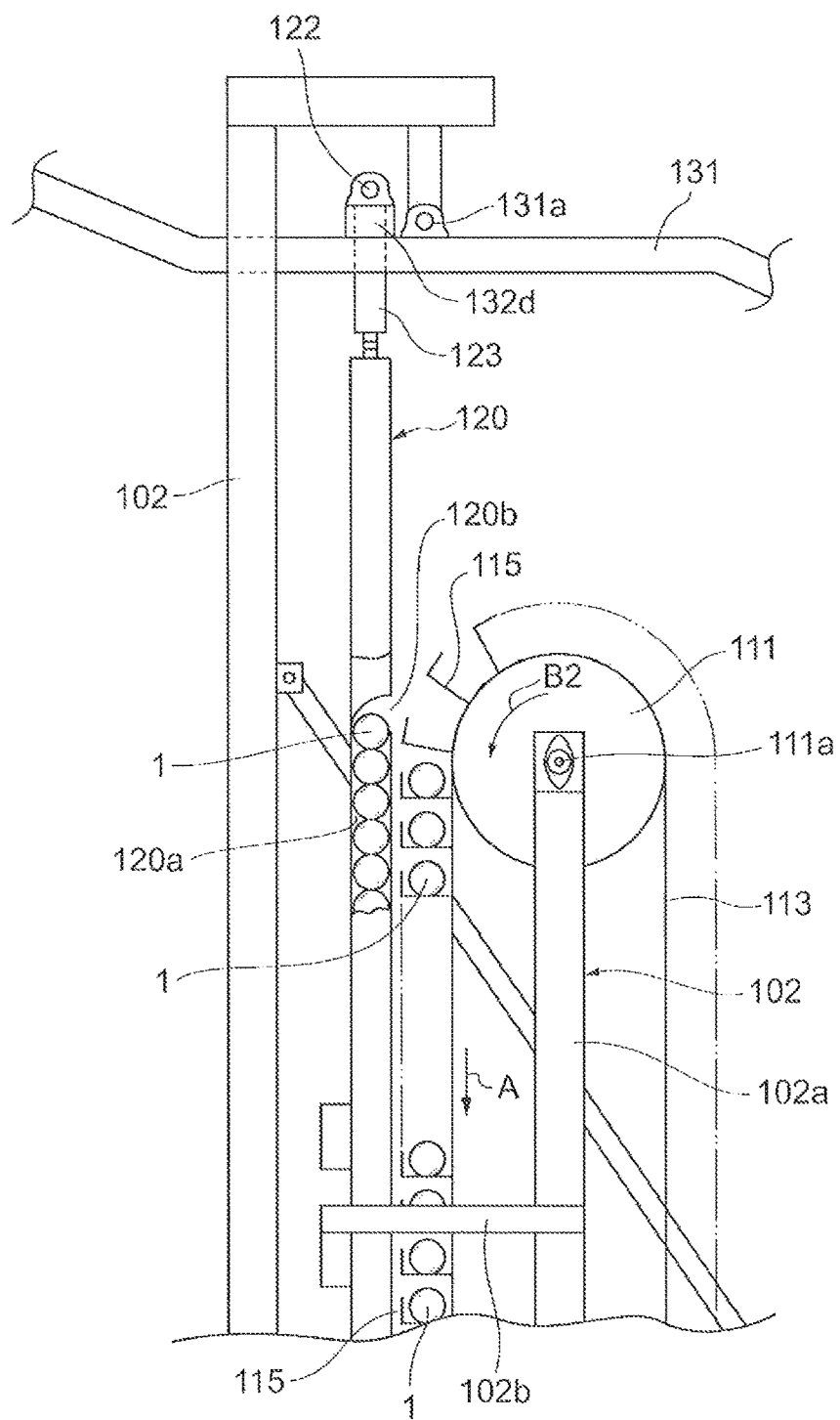
FIG. 7 is an illustration outlining the configuration of the main elements of a motion conversion device according to the second embodiment.

When a steel ball 1 is received in a basket 115, the weight of the steel ball 1 works upon one side of the chain 113, the left side of the chain 113 moves downward as shown by arrow A in FIG. 6, and force works upon the sprockets 111,112 so that they rotate in the counterclockwise direction, as shown by arrows B1, B2. As the chain 113 moves in this way, steel balls 1 are continuously supplied one after another to the baskets 115, and a force corresponding to the total weight of the steel balls 1 in the baskets 115 on the left side of the chain 113 causes the left side of the chain 113 to move downward (in the direction of arrow A), as shown in FIG. 6. In this configuration, which is similar to that of the first embodiment described above, the openings of the baskets 115 face downward when the chain 113 wraps around the lower sprocket 112 and turns over, ejecting the steel balls 1.

Thus, the rotational force generated when the left side of the chain 113 moves downward, as shown by arrow A, and the sprockets 111, 112 rotate in the counterclockwise direction, as shown by arrows B1, B2, is conveyed to a power generator 165 by a chain transmission mechanism 160, driving the power generator 165 to rotate and generate power. The chain transmission mechanism 160 is provided with a first chain 161 coupling the lower sprocket 112 and an overdrive mechanism 162 provided on the base platform 100, and a second chain 163 coupling the overdrive mechanism 162 and the power generator 165, the rotation of the sprocket 112 being increased by the overdrive mechanism 162 and conveyed to the power generator 165, rotatably driving the power generator 165.

As can be seen from the above description, it is possible to rotate the sprockets 111, 112, rotatably driving the power generator to generate electricity, by continuously supplying steel balls 1 one after another to the baskets 115 in time with the movement of the chain 113 in the direction of arrow A. The motion conversion device according to the second embodiment is also provided with a steel ball supply device for supplying steel balls 1 in order, which will be described hereafter.

The steel ball supply device is provided with a steel ball holding tube 120 having a cylindrical holding space 120a extending in the perpendicular direction and capable of holding the plurality of steel balls 1 in a vertical row, and an electrically operated balancer mechanism 130 capable of raising the steel ball holding tube 120 in which the plurality of steel balls 1 are contained and held in a vertical row within the holding space 120a. The balancer mechanism 130 comprises a balancer arm 131 rockably supported by the upper end of a second support device 102 provided standing on the base platform 100 by a rocking shaft 131a, a balancer weight 132 attached to an end 131b (the right end in FIG. 6) of the balancer arm 131, a balancer rope 133 coupled to the other end 131c (the left end in FIG. 6), and a take-up drum 134 for taking up and letting out the balancer rope 133, around which the rope is wound and held. The take-up drum 134 is rotatably supported by a support rod 103 attached to the base platform 100, and is rotatably driven by a balancer motor 150 constituted by an electric motor.

A support member 132d is provided in the center of the balancer arm 131 apart from the rocking shaft 131a, a holding head 123 is rockably attached to the support member 132d by an axle 122, and the steel ball holding tube 120 is suspended hanging downward from the holding head 123. An adjustment mechanism (not shown) for adjusting the vertical position of the steel ball holding tube 120 is provided at the coupling of the holding head 123 and the steel ball holding tube 120. Sideways-extending support arms 101b, 101c are provided in the middle and lower parts of the support member 101a constituting the first support device 101, the support arms 101b, 101c guiding and holding the steel ball holding tube 120 so as to enable vertical movement. Upper and lower detection switches 151, 152 constituted by, for example, limit switches, are attached to upper and lower parts of the steel ball holding tube 120 on either side of the upper support arm 101b. Thus, when the steel ball holding tube 120 is raised, the lower detection switch 152 contacts the lower surface of the support arm 101b, as shown in the drawing, and the lower detection switch 152 is turned on, sending a detection signal to a controller 155. Conversely, when the steel ball holding tube is lowered, the upper detection switch 151 contacts the upper surface of the support arm 101b, and the upper detection switch 151 is turned on, sending a detection signal to the controller 155. The controller 155 controls the driving of the balancer motor 150 according to these detection signals. Specifically, as described hereafter, the driving of the balancer motor 150 causes the take-up drum 134 to take up the balancer rope 133, and a control is performed to cut the power supply to the balancer motor 150 and allow same to rotate freely. Instead of being allowed to freely rotate, the balancer motor 150 may also be driven to rotate in the reverse direction, letting out the balancer rope 133.

In this way, the control of the balancer motor 150 by the controller 155 of the balancer mechanism 130 causes the take-up drum 134 to engage in driven or free rotation, alternately taking up and letting out the balancer rope 133. The balancer weight 132 is set to a weight such that the balancer arm 131 rotates in the clockwise direction as seen in the drawing when not subjected to an external force. For this reason, when the balancer motor 150 is in a freely rotatable state, the weight balance of the balancer arm 131 causes the balancer rope 133 to be let off of the take-up drum 134, and the balancer arm 131 to rock in the clockwise direction. FIGS. 6 and 7 show the balancer rope 133 being let off of the take-up drum 134, the balancer arm 131 rocking in the clockwise direction, the lower detection switch 152 contacting the lower surface of the support arm 101b, and an ON operation detection signal being sent from the lower detection switch 152 to the controller 155. When the controller 155 receives this detection signal, it performs control so that the balancer motor 150 is driven, causing the take-up drum 134 to take up the balancer rope 133.

This pulls the left end of the balancer arm 131 downward, rocking the balancer arm 131 in the counterclockwise direction. This in turn causes the axle 122 coupled to the steel ball holding tube 120 to move downward, lowering the steel ball holding tube 120. When the steel ball holding tube 120 is lowered to the point that the upper detection switch 151 contacts the upper surface of the support arm 101b, the upper detection switch 151 is switched on, and a detection signal is sent to the controller 155. When the controller 155 receives the detection signal, it cuts the power supply to the balancer motor 150, placing the motor in a state of free rotation, and causes the balancer rope 133 to be let off of the take-up drum 134. As a result, the balancer arm 131 rocks in the clockwise direction. The control of the driving of the balancer motor 150 by the controller 155 causes the balancer arm 131 to rock, the steel ball holding tube 120 to move upward and downward, and steel balls 1 to be continuously supplied one after another in time with the movement of the baskets 115, as discussed below.

The configuration and operation through which steel balls 1 are continuously supplied into the baskets 115 one after another in time with the raising and lowering of the steel ball holding tube 120 by the balancer mechanism 130 is similar to that of the first embodiment, and a description thereof will thus be omitted. A steel ball insertion and holding mechanism 125 having a configuration identical to that provided on the bottom part of the steel ball holding tube 5 in the first embodiment is provided on the lower end of the steel ball holding tube 120. The steel ball supply device according to the second embodiment is also provided with a lower roll guide for guiding steel balls 1 ejected from the baskets 115 at the bottom of the chain mechanism 110 in accordance with the rotation of the upper and lower sprockets 111, 112 and the movement of the chain 113 of the chain mechanism 110 to a position directly beneath the steel ball holding tube 120. A shallow holding groove for holding in place steel balls 1 having rolled to the position directly beneath the steel ball holding tube 120 of the lower roll guide is formed at this position. Underneath the holding groove are formed the steel ball holding mechanism 125 and an insertion groove formed so that the lower end of the steel ball holding tube 120 can be inserted therein. These elements have configuration identical to those in the first embodiment; thus, a description thereof will be omitted.

Figure 5:
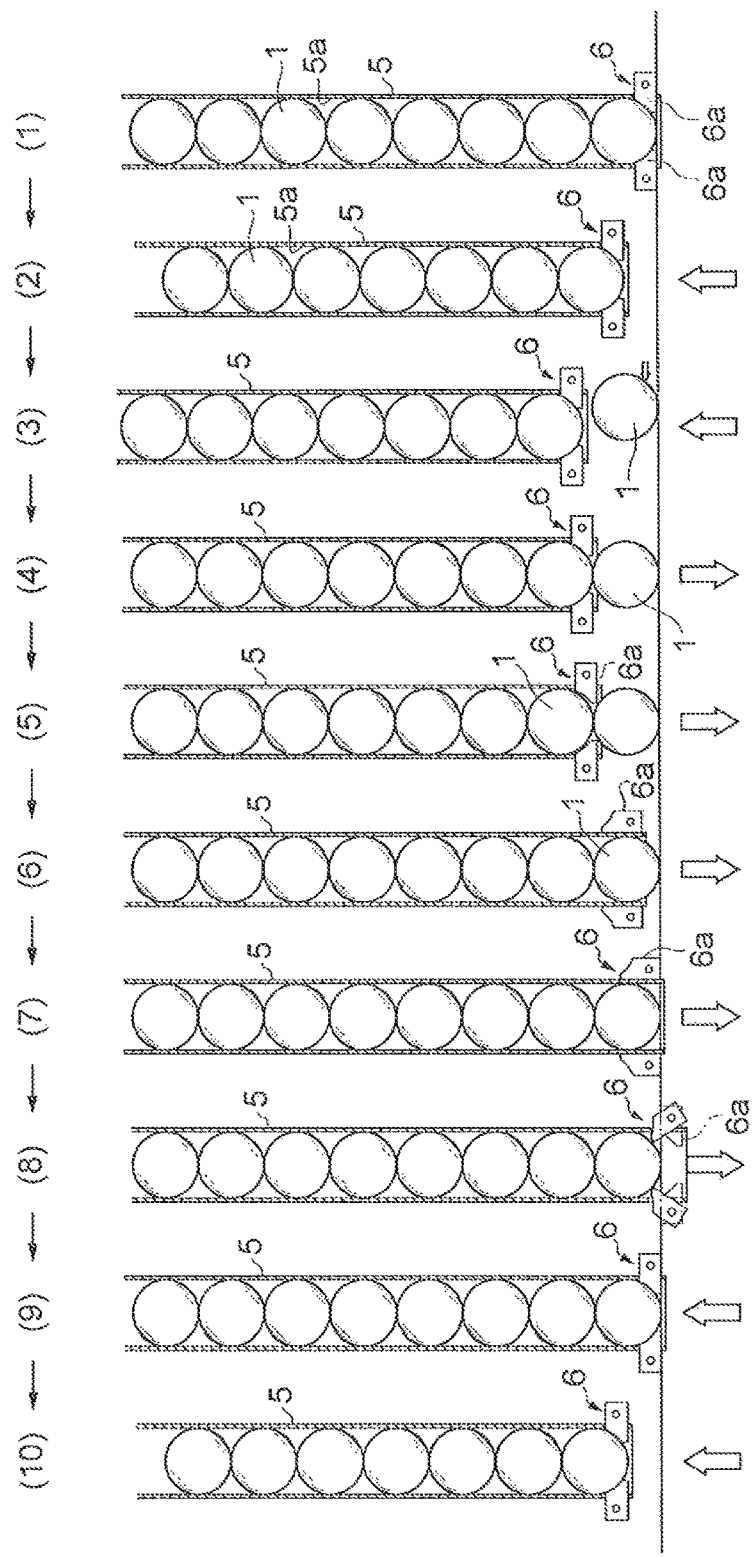
FIG. 5 is an illustration outlining the operation of a motion conversion device according to the first embodiment.

In the above configuration, the movement of the steel balls 1 within the holding space 120a when the steel ball holding tube 120 is rocked up and down by the balancer mechanism 130 is identical to that of the first embodiment shown in FIG. 5. Thus, an attendant description will also be omitted.

As can be seen from the foregoing, it is possible, through the raising and lowering of the steel ball holding tube 120 by the balancer mechanism 130, to force the steel ball 1 having rolled down the lower roll guide onto the holding groove into the holding space 120a, and to eject the uppermost steel ball 1 within the holding space 120a from an outlet 120b, causing the ball to roll into the basket 115. Guiding steel balls 1 into the baskets 115 in this way causes the chain mechanism 110 to operate and the lower sprocket 112 to rotate, rotatably driving the power generator 165 to generate electricity. At this time, the operation position of the steel ball holding tube 120 is detected by the upper and lower detection switches 151, 152, the controller 155 controls the driving of the balancer mechanism 130 (i.e., the driving of the balancer motor 150) according to the detected position, the steel ball holding tube 120 is continuously moved upward and downward, steel balls 1 are continuously supplied one after another to the baskets 115, and the chain mechanism 110 is continuously operated, allowing efficient generation of power by the power generator 165.

When the power generator 165 is driven to generate power, the rotational speed of the power generator 165 is controlled by adjusting the electrical load upon the power generation output of the power generator 165. By controlling the rotational speed of the power generator 165, the operation speed of the chain mechanism 110, i.e., the downward travel speed of the baskets 115, is adjusted, causing the steel balls 1 ejected from the steel ball holding tube 120 to enter the baskets 115 in time with the motion thereof.

EXPLANATION OF NUMERALS AND CHARACTERS

1: Steel ball
5, 120: Steel ball holding tube
5a, 120a: Holding space
10, 110: Chain mechanism
11, 12, 111, 112: Sprocket
13, 113: Chain
15, 115: Basket
20: Air supply source
21: Air supply control valve
25, 155: Controller
30, 130: Balancer mechanism
50, 151, 152: Position detection switch

The invention claimed is:
1. A sphere holding apparatus comprising:
a sphere holding member capable of holding a plurality of spheres in a vertical row, the sphere holding member having a cylindrical holding space extending vertically;
a sphere insertion and holding mechanism for holding the spheres so that the spheres can be inserted into the holding space from the lower end of the sphere holding member but the spheres do not fall downward out of the holding space, the sphere insertion and holding mechanism being provided at the lower end of the sphere holding member; and a vertical operating mechanism that is capable of performing a raising operation of raising the sphere holding member and a lowering operation for lowering the sphere holding member, wherein, the sphere insertion and holding mechanism is provided with three holding claws extending into the holding space at the lower end of the sphere holding member, and the three holding claws are hingeably attached to the lower end of the sphere holding member so as to be capable of rocking upward from a position projecting horizontally in to the holding space, the sphere holding member has an opening at the top end through which spheres held in a vertical row within the holding space is spilled out one by one, a sphere receiving position for receiving a sphere one by one is provided opposing the lower end of the sphere holding member, when the sphere holding member is raised by the vertical operating mechanism, a space for receiving a sphere one by one is made between the lower end of the sphere holding member and the sphere receiving position, and when the sphere holding member is lowered by the vertical operating mechanism, the sphere at the sphere receiving position is inserted into the holding space by rocking the three claws upward to allow the sphere to enter into the holding space, and then when the sphere is moved upward passing the tip ends of the claws, the claws are returned to the horizontally extending position to hold the sphere in the holding space.

2. The sphere holding apparatus according to claim 1, wherein, the vertical operating mechanism comprises a balancer mechanism to help the raising operation and the lowering operation.

\* \* \* \* \*